United States Patent
Lee et al.

(10) Patent No.: US 7,891,077 B2
(45) Date of Patent: Feb. 22, 2011

(54) METHOD OF PREPARING A POLYMER ACTUATOR

(75) Inventors: Hyung Kun Lee, Daejeon (KR); Nak Jin Choi, Daejeon (KR); Kang Ho Park, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/179,545

(22) Filed: Jul. 24, 2008

(65) Prior Publication Data
US 2009/0027833 A1      Jan. 29, 2009

(30) Foreign Application Priority Data
Jul. 26, 2007    (KR) ............... 10-2007-0074830

(51) Int. Cl.
*H04R 31/00*    (2006.01)

(52) U.S. Cl. .............. 29/594; 29/609; 29/855; 29/856; 205/119; 205/122; 361/523; 428/422; 428/457

(58) Field of Classification Search ........... 29/594, 29/609, 855, 856; 205/119, 122; 361/523; 427/77, 129, 130; 428/422, 457
See application file for complete search history.

(56) References Cited

U.S. PATENT DOCUMENTS 6,003,955 A * 12/1999 Ladd .................. 301/37.34
6,897,601 B2 * 5/2005 Birth et al. ............ 310/334
2006/0102862 A1 * 5/2006 Sobek ................. 251/129.01
2006/0266642 A1 * 11/2006 Akle et al. ............ 204/282

FOREIGN PATENT DOCUMENTS

| JP | 2005-033991 | | 2/2005 |
| KR | 1020030095529 | A | 12/2003 |
| KR | 10-2006-0052980 | A | 5/2006 |

OTHER PUBLICATIONS

Sia Nemat-Nasser et al., "Electroactive Polymer [EAP] Actuators as Artificial Muscles:reality, potential, and challenges," pp. 4-5, 140-141, SPIE Press, 2001.
Barbar J. Akle et al., "Multilayer ionic polymer transducer", Smart Structures and Materials 2003, Proceedings of SPIE vol. 5051 (2003), pp. 214-225.
Shingjiang Jessie Lue et al., "Plasma modification on a Nafion membrane for direct methaol fuel cell applications", Korea J. Chem. Eng. (vol. 23, No. 3), May 2006, pp. 441-446.

(Continued)

*Primary Examiner*—Paul D Kim

(57) ABSTRACT

A method of preparing a polymer actuator includes providing an ionic conductive polymer membrane; forming first and second metal electrodes respectively over first and second surfaces of the ionic conductive polymer membrane; substituting water used in the formation of the first and second metal electrodes with an ionic liquid stable to an electrolysis; and coating the first and second surfaces of the metal electrodes with a coating material.

8 Claims, 3 Drawing Sheets

OTHER PUBLICATIONS

Doyeon Kim et al., "Electro-chemo-mechanical Interpretation of Pt and Au-electroded Relaxationless Ionic Polymer-Metal Composites", Smart Structures and Materials 2006, Proceedings of SPIE vol. 6168, 2006.

Matthew D. Bennett et al., "A model of charge transport and electromechanical transuction in ionic liquid-swollen Nafion membranes", Polymer 47 (2006) pp. 6782-6796.

M Shahinpoor et al., "Ionic polymer-metal composites (IPMCs) as biomimetic sensors, actuators and artificial muscles—a review", Smart Mater. Struct. 7 (1998) pp. R15-R30.

Sia Nemat-Nasser et al., "Electroactive polymer (EAP) actuators as artificial muscles: reality, potential and challenges", SPIE Press, 2004.

* cited by examiner

METHOD OF PREPARING A POLYMER ACTUATOR

CROSS-REFERENCE TO RELATED APPLICATION

This application claims priority to and the benefit of Korean Patent Application No. 2007-74830, filed Jul. 26, 2007, the disclosure of which is incorporated herein by reference in its entirety.

BACKGROUND

1. Field of the Invention

The present invention relates to a surface-coated polymer actuator and a method of preparing the same, and more particularly, to a surface-coated polymer actuator which can prevent the leakage of a solvent from an electrode's surface, and a method of preparing the same.

The present invention has been deduced from a research performed as a part of the Component Modules for Ubiquitous Terminal Business Planning by the Ministry of Information and Communication (South Korea) [2006-S-006-02, Component Modules for Ubiquitous Terminal].

2. Discussion of Related Art

Lately, many scientists have been actively conducting research on ionic polymer metal composites (IPMCs), which is one of electroactive polymers (EAPs) [Sia Nemat-Nasser and Chris W. Thomas, *Electroactive polymer (EAP) actuators as artificial muscles: reality, potential and challenges*, SPIE press, Washington, 2001].

Particularly, among various kinds of EAPs, the IPMC has advantages of low power consumption, large displacement at low voltage, and a fast response time in high frequency [M. Shahinpoor, Y. Bar-Cohen, J. O. Simpson, J. Smith, *Smart Materials and Structures*, 1998, 7, R15].

The IPMC consists of a fluorinated ionic polymer membrane such as a Nafion™ membrane, and a conductive metal, wherein both surfaces of Nafion™ are electroplated with metal electrodes. As seen in FIG. 1, when cations in the membrane are moved by applying an electrical field to the metal electrodes, the membrane is swollen, and bent in the opposite direction to the movement of the cations, which results in the transformation of the membrane in the electrical field. Such transformation can be adjusted according to cations which are electrolytes present in the IPMC, a solvent (e.g., water, polar solvent or ionic liquid) delivering the cations, a voltage applied to the electrodes disposed on both the surfaces of the membrane, or a frequency [Barbar J. Akle and Donald J. Leo, *SPIE*, 2003, 5051, 214].

Most actuators use water as a polar solvent, preparation of which is simple. However, such an actuator is limited in use at very high and low temperatures due to boiling and melting points of water. For example, due to water's freezing and boiling points, the actuator is difficult to be operated under 0° C., and less stable at high temperature required in a module manufacture. To solve these problems, scientists employ ionic liquids taking advantage of melting and boiling points [M. D. Bennett, D. J. Leo, G. L. Wilkes, F. L. Beyer, T. W. Pechar Polymer, 2006, 47, 6782; Doyeon Kim and Kwang J. Kim, *SPIE*, 2006, 6168, 616811].

To enhance the stability of a polymer actuator, a search for improving contact between a Nafion™ membrane and a metal electrode to overcome performance degradation of the actuator caused by the detachment of the metal electrode which may occur during the actuation of the polymer actuator is actively progressing. As a part, a sandblasting or plasma treatment method has been developed and disclosed [S. J. Lue, T. S. Shin, T. C. Wei, *Korean J. Chem. Eng.* 2006, 23, 441]. However, this method cannot prevent the leakage of a solvent caused by damage of a metal electrode itself, and thus cannot overcome decreasing drivability and stability of the polymer actuator.

Accordingly, the present inventors found that a polymer actuator which can overcome the leakage of a solvent or an electrolyte and improve displacement and drivability is prepared by coating surfaces of an electrode of a polymer actuator with a compound having elasticity and chemical durability, and the present invention was completed.

SUMMARY OF THE INVENTION

The present invention is directed to a polymer actuator capable of improving displacement and drivability by preventing the leakage of a solvent and an electrolyte.

The present invention is directed to a method of preparing a polymer actuator capable of improving displacement and drivability by preventing the leakage of a solvent and an electrolyte.

One aspect of the present invention provides a polymer actuator, including: an ionic conductive polymer membrane; metal electrodes formed on both surfaces of the ionic conductive polymer membrane; and coating layers formed on both the surfaces of the metal electrodes.

The ionic conductive polymer membrane may be a Nafion™ polymer membrane.

The metal electrodes may be formed of platinum or gold.

The coating layer may be formed of a coating material with elasticity and chemical durability, and preferably polyurethane or silicon.

Another aspect of the present invention provides a method of preparing a polymer actuator, including: preparing an ionic conductive polymer membrane; forming metal electrodes on both surfaces of the ionic conductive polymer membrane; and coating the surfaces of the metal electrodes with a coating material with elasticity and chemical durability.

The method may further include substituting water with a polar solvent having a lower freezing point and a higher boiling point than water used in the formation of the metal electrodes, or an ionic liquid stable to the electrolysis after forming the metal electrodes.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Hereinafter, the present invention will be described with reference to the accompanying drawings in detail.

Figure 1:
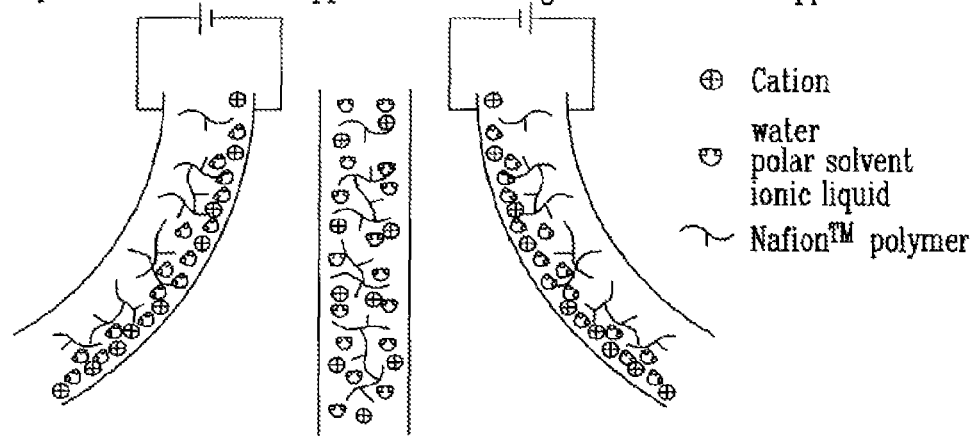
FIG. 1 is a view illustrating the operation principle of a polymer actuator.
Figure 2:
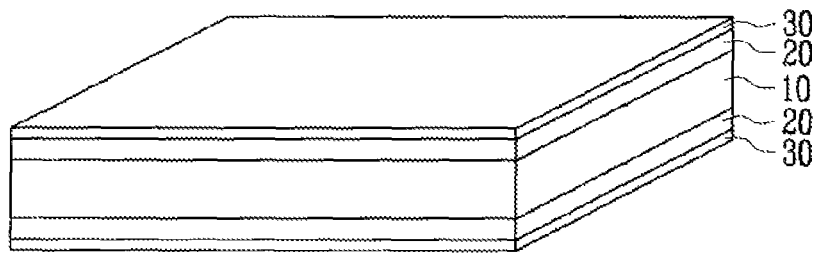
FIG. 2 is a schematic view of a surface-coated polymer actuator.
Figure 3:
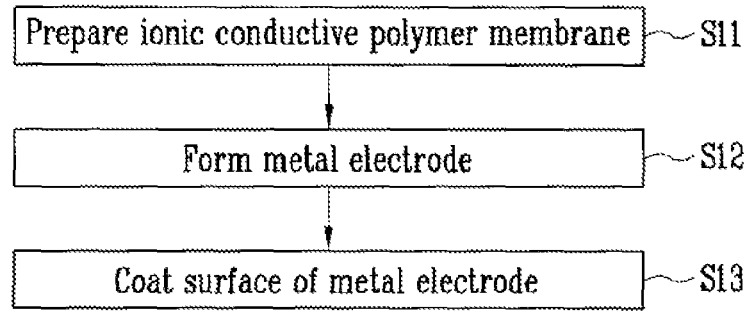
FIG. 3 is a flowchart illustrating a method of preparing a surface-coated polymer actuator.

FIG. 2 is a schematic view of a polymer actuator according to the present invention, and FIG. 3 is a flowchart illustrating a method of preparing a polymer actuator according to the present invention.

Referring to FIG. 2, a polymer actuator according to the present invention includes an ionic conductive polymer membrane 10, metal electrodes 20 formed on both surfaces of the ionic conductive polymer membrane, and coating layers 30 formed on surfaces of the metal electrodes.

Referring to FIG. 3, the polymer actuator according to the present invention is prepared by the steps of: preparing an ionic polymer membrane (S11); forming metal electrodes on both surfaces of the ionic conductive polymer membrane (S12); and coating the surfaces of the metal electrodes with a coating material with elasticity and chemical durability (S13).

In step S11, the ionic conductive polymer membrane 10 may use any ionic conductive polymer membrane commonly used in this field, and preferably a Nafion™ membrane.

Subsequently, in step S12, the metal electrodes 20 may be any metal available in this field, and preferably platinum or gold. The thickness of the metal electrodes may be selected within a common range commonly used in this field, and preferably 5 to 10 µm. The metal electrodes may be formed by electroless-plating.

To bend the ionic conductive polymer membrane by an electrical device, both the surfaces of the polymer membrane are coated with metal electrodes by an electroless-plating process which conforms to Oguro's method (cf. K. Oguro, http://ndeaa.jpl.nasa.gov/nasa-nde/lommas/esp/IPMC.htm), and the process using Nafion™ (DuPont) as an ionic conductive polymer membrane will be described in detail.

1) Surface treatment: An increase in adhesive strength of a Nafion™ surface by mild sandblast or plasma treatment 2) Ion exchange (adsorption): Substitution of H+ of a sulfonic acid group (—SO$_3$H), a hydrophilic group of Nafion™ with [Pt(NH$_3$)$_4$]$^{2+}$ 3) Primary electroless-plating (reduction): Reduction of platinum salt adsorbed into Nafion™ (stage 2) into platinum metal

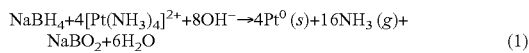

$$NaBH_4 + 4[Pt(NH_3)_4]^{2+} + 8OH^- \rightarrow 4Pt^0(s) + 16NH_3(g) + NaBO_2 + 6H_2O \qquad (1)$$

4) Secondary reduction (surface electrode): Addition of a metal (platinum) onto the platinum layer of the polymer's surface 5) Ion exchange: Substitution of H+ ion present in Nafion™ with a cation An ionic conductive polymer metal composite (IPMC) is prepared by forming metal electrodes on both surfaces of an ionic conductive polymer membrane.

Subsequently, the IPMC may be substituted by various solvents depending on a use. When the IPMC is used in a living body, further substitution is not needed, since water is already substituted in step 5). However, when the polymer actuator is actuated under the freezing point (0° C.) or over the boiling point (100° C.) of water, water must be substituted with a polar solvent (e.g., propylene carbonate) having a lower freezing point and a higher boiling point than water. In addition, the solvent must be substituted with an ionic liquid (e.g., 1-ethyl-3-methylimidazolium trifluoromethanesulfonate, EMIM-TfO) which is stable at high temperature such that it's boiling point is not observed, and stable under electrolysis when the polymer actuator must be actuated under a voltage of at least 1.5V. The process is as follows.

6) Removing water by drying the water-substituted polymer actuator in a vacuum state. This step is performed at the boiling point or more of water, for example, 110° C., for 10 to 14 hours.

7) Expanding the polymer actuator in a substitution solvent while heating at 50 to 70° C.

8) Drying the solvent-substituted polymer actuator in a vacuum state. This step is performed at 100 to 120° C. for 2 to 4 hours.

Subsequently, the coating layer 30 is formed on the surfaces of the electroplated metal electrodes (S13). The coating layer 30 may be formed of a coating material with elasticity and chemical durability, and preferably, polyurethane or silicon. The thickness of the coating layer may be determined according to needs of those skilled in the art, and preferably selected within a range of 10 to 20 µm. When the coating layer is formed thicker than the predetermined thickness, displacement of the polymer actuator may be decreased, whereas, when the coating layer is formed thinner, the solvent may leak due to an inner pressure generated by the cation and solvent during the actuation of the polymer actuator, which results in a decrease in durability. The coating layer may be formed by a common method such as dip-coating or bar-coating.

When the surfaces of the metal electrodes are coated with the coating material, the electrode surfaces of the polymer actuator may be cleaned with N$_2$ or extrusion air to eliminate effects of the solvent and fine particles.

Thus, the polymer actuator with large displacement and high drivability may be prepared through the drying and hardening of the coating material.

Hereinafter, the present invention may be described with reference to exemplary embodiments in detail to be more easily understood to those skilled in the art.

Exemplary Embodiment 1

Abrasion of Surface of Membrane

To increase a surface area of a Nafion™ membrane (Nafion 117, DuPont), the surface of the membrane was sandblasted using fine aluminum oxide beads (diameter: 25, 50 um). The sandblasting was performed at a rate of about 1 second per area (cm$^2$).

Ion Exchange (Adsorption)

A platinum complex ([Pt(NH$_3$)$_4$]Cl$_2$) solution of 2 mg per ml is prepared, and the membrane was immersed in a solution containing 3 mg or more Pt per membrane area (cm$^2$). For example, at least 45 ml Pt solution is needed for the membrane having an area of 30 cm$^2$. After that, a 1 ml ammonium hydroxide solution (5%) was added for neutralization. The membrane was immersed for at least 9 hours (usually, overnight) at room temperature.

First Electroless-Plating (Reduction)

The membrane having an area of 30 cm$^2$ was cleaned with water, and a 2 ml sodium borohydride solution (5 wt % NaBH$_4$ (aq)) was added seven times every 30 minutes to a 180 ml stirring solution in a water tank of 40° C. The amount of the sodium borohydride solution has to be proportional to the area of the membrane. In an 8$^{th}$ addition, a 20 ml reducing agent (NaBH$_4$) was added, and the mixture was stirred for one and a half hours. The temperature was increased in every addition, and finally adjusted to 60° C. in the 8$^{th}$ addition. The fine Pt particles were adsorbed on the membrane's surface, which became black. The membrane was cleaned with water, and then immersed in diluted HCl (0.1N) for one hour.

Second Electroless-Plating (Development)

The amount of platinum adsorbed by the first electroless-plating process was 0.9 mg/cm$^2$ or less, which was dependant on the amount of ion exchange, the thickness of the membrane and the structure of the Pt complex. Additional Pt was electroplated on the Pt layer of the first electroless-plating process by a second electroless-plating process. To add 2 mg/cm$^2$ Pt for the membrane having an area of 60 cm$^2$, a 240 ml complex solution ([Pt(NH$_3$)$_4$]Cl$_2$) containing 120 mg Pt was prepared, and a 5% ammonium hydroxide solution of 5 ml was added thereto. The amount of electroless-plating was determined by Pt content in the solution. The membrane was immersed in the Pt solution stirring at 40° C., and a 5% hydroxylamine hydrochloride (NH$_2$OH—HCl) solution of 6 ml and a 20% hydrazine (NH$_2$NH$_2$) solution of 3 ml were added thereto for 4 hours at 30-minute intervals. Starting from 40° C., the temperature of the mixture was increased in every addition, and finally adjusted to 60° C. in the 8$^{th}$ addition. Thus, a grey metal layer was formed. At the end of the process, a small amount of the solution was sampled and boiled with a reducing agent (NaBH$_4$) to check an end point. When a Pt ion remained in the electroless-plating solution, Pt was continuously formed by the addition of NH$_2$OH—HCl and NH$_2$NH$_2$, and when no Pt ion remained in the electroless-plating solution, the membrane was cleaned with water, and boiled in diluted HCl (0.1N) to remove an ammonium cation from the membrane. After that, H+ in the membrane was exchanged into a cation by immersing the layer in a solution of Cl+ salt, and thus an ionic polymer metal complex was prepared.

Ionic Liquid Substitution

The ionic polymer metal complex was dried for 12 hours at 110° C. under a vacuum to remove water. Then, while heating at 60° C., the ionic polymer metal complex was immersed in an ionic liquid (1-ethyl-3-methylimidazolium trifluoromethanesulfonate) for expansion. Subsequently, the complex substituted with the ionic liquid was dried for 3 hours at 110° C. under a vacuum, and thus a polymer actuator was prepared.

Coating with Polyurethane

35% HWU-101A (Hepcechem) was used as coating polyurethane. The polymer actuator was immersed in a 10 ml polyurethane suspension (conc.: 35%) for one minute, dried at 60° C. for 5 minutes, and hardened at 110° C. for 2 to 3 minutes, so as to prepare a polyurethane -coated polymer actuator.

Exemplary Embodiment 2

Except for using 35% 2100A (Hepcechem) as coating polyurethane, a polymer actuator was prepared in the same manner as Exemplary Embodiment 1.

EXPERIMENTAL EXAMPLES

Measurement of Displacement

Figure 4:
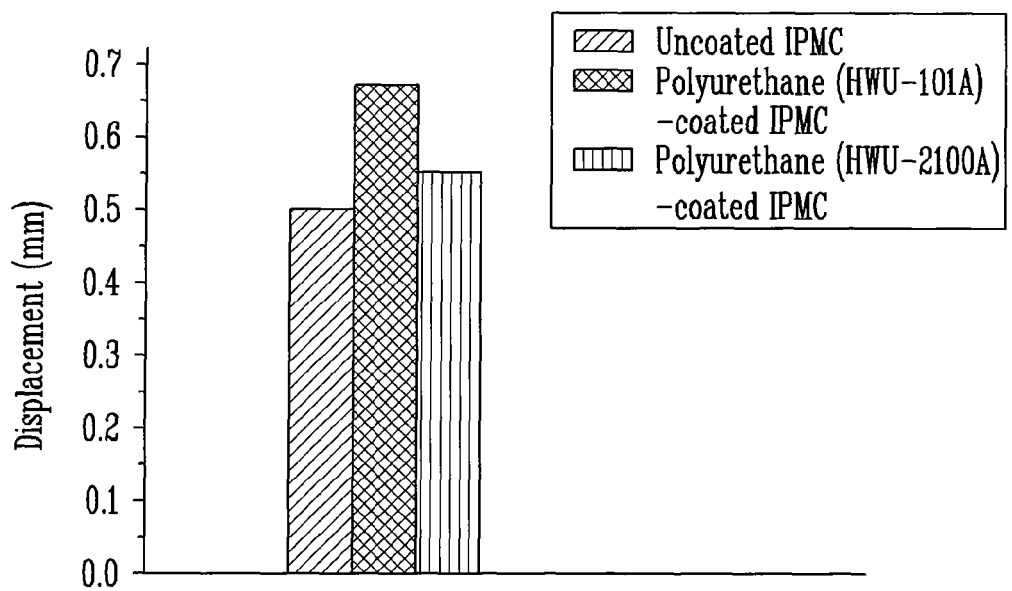
FIG. 4 is a graph illustrating the displacement characteristics of a surface-coated polymer actuator.

Measurement results of displacements of the polymer actuators before and after the polyurethane coating, which were prepared in Exemplary Embodiments 1 and 2 are shown in FIG. 4. The displacement was measured when a voltage (3V, 0.1 Hz) was applied to the polymer actuator formed in a strip shape having a size of 2×8 mm$^2$ using a frequency generator.

As can be seen in FIG. 4, all samples of the polymer actuators including an ionic solvent which were coated with two kinds of polyurethane exhibited increased displacements. It can be concluded that the HWU-101A has a lower modulus and thus a better displacement characteristic than the HWU-2100A.

Measurement of Drivability

Figure 5:
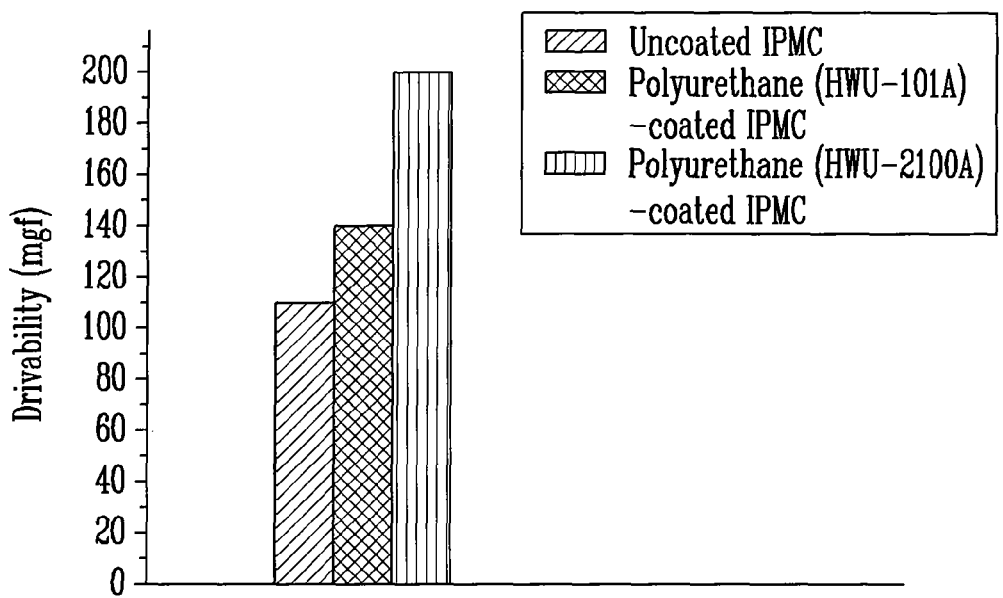
FIG. 5 is a graph illustrating the increasing drivability of a surface-coated polymer actuator.

Measurement results of drivability of the polymer actuators before and after the polyurethane coating, which were prepared in Exemplary Embodiments 1 and 2, are shown in FIG. 5. The displacement and the number of driving were measured when a voltage (3V, 0.1 Hz) was applied to the polymer actuator formed in a strip shape having a size of 2×8 mm$^2$ before and after the surface coating.

As can be seen in FIG. 5, all samples of the polymer actuators coated with two kinds of polyurethane exhibited increased drivability. In particular, HWU-2100A has a higher modulus, and thus has a better drivability than HWU-101A. As compared with the non-coated polymer actuator, the coated actuator increased twice in drivability.

Measurement of Stability

Figure 6:
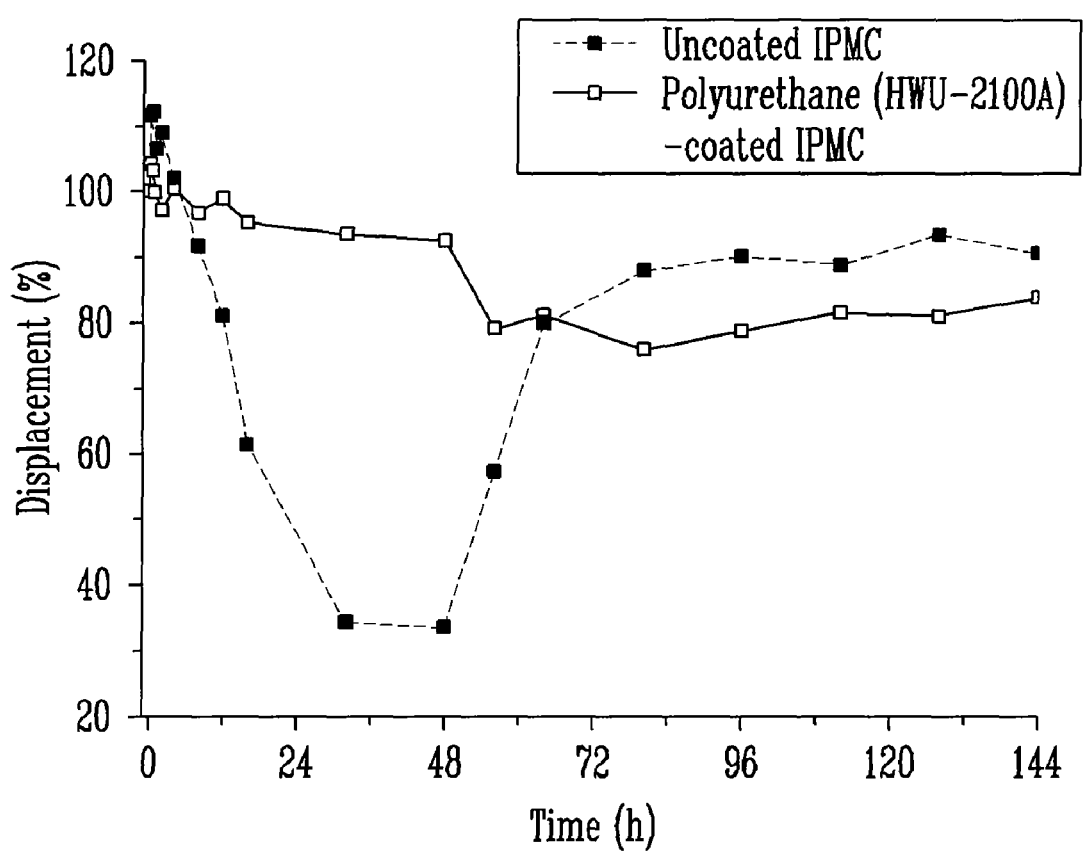
FIG. 6 is a graph illustrating the stability of a surface-coated polymer actuator.

Measurement results of stability of the polymer actuator before and after the polyurethane coating, which was formed in Exemplary Embodiment 2, are shown in FIG. 6. The displacement was measured when a voltage (3V, 0.5 Hz) was applied to the polymer actuator formed in a strip shape having a size of 2×8 mm$^2$ before and after the surface coating, and the change thereof by time was shown in the graph.

As can be seen from FIG. 6, the uncoated polymer actuator has a great change in displacement, but the polyurethane-coated polymer actuator has a relatively small change (about 70% to the first value) for 144 hours. Thus, it can be concluded that the leakage of solvent contained in the polymer actuator is prevented and thus a specific solvent and cation electrolytes are maintained in the polymer actuator due to the polyurethane coating, so that the displacement can be constantly maintained.

By coating a surface of an electrode of a polymer actuator with a coating material having elasticity and excellent chemical durability, the leakage of solvent or electrolytes can be prevented during the actuation of the polymer actuator, and thus the displacement and drivability of the polymer actuator can be improved.

Further, the polymer actuator prepared by coating the electrode's surface can improve its durability.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of preparing a polymer actuator, the method comprising:
    providing an ionic conductive polymer membrane;
    forming first and second metal electrodes respectively on and in contact with first and second surfaces of the ionic conductive polymer membrane to obtain an integrated ionic polymer-metal complex;
    substituting solvent contained in the integrated ionic polymer-metal complex with an ionic liquid; and
    coating the substituted ionic polymer metal complex with a coating material,
    wherein the ionic liquid has a higher boiling point and a lower freezing point than water
    wherein the substituting step includes:
        drying the ionic polymer-metal complex;
        expanding the ionic polymer-metal complex by immersing the ionic polymer-metal complex in the ionic liquid; and
        drying the substituted ionic polymer-metal complex.

2. The method of claim 1, wherein the first and the second electrodes are formed on the ionic conductive polymer membrane by an ion exchange method to form the ionic polymer-metal complex.

3. The method of claim 1, wherein the ionic liquid is 1-ethyl-3-methylimidazolium trifluoromethanesulfonate (EMIM-TfO) or propylene carbonate.

4. The method of claim 1, wherein the solvent substituted with the ionic liquid is water.

5. The method of claim 1, wherein the coating material has elasticity and chemical durability.

6. The method of claim 1, wherein the coating material is polyurethane, the first and second metal electrodes include platinum, and the first and second electrodes are formed on the opposite surface of the ionic conductive polymer membrane to form the ionic polymer-metal complex.

7. The method of claim 1, wherein the coating material includes polyurethane or silicon.

8. The method of claim 1, wherein the first and second metal electrodes include platinum, gold, or a combination thereof.

* * * * *